(12) United States Patent
Guidotti et al.

(10) Patent No.: US 7,303,593 B1
(45) Date of Patent: Dec. 4, 2007

(54) METHOD TO BLEND SEPARATOR POWDERS

(75) Inventors: Ronald A. Guidotti, Albuquerque, NM (US); Arthur H. Andazola, Albuquerque, NM (US); Frederick W. Reinhardt, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 1159 days.

(21) Appl. No.: 10/246,609

(22) Filed: Sep. 16, 2002

(51) Int. Cl.
*C01D 1/30* (2006.01)

(52) U.S. Cl. .................................... 23/302 R

(58) Field of Classification Search ................ 423/497; 23/304, 302 R
See application file for complete search history.

(56) References Cited

U.S. PATENT DOCUMENTS

| 4,421,579 A | 12/1983 | Covitch et al. |
| 4,518,718 A | 5/1985 | Frost |
| 4,981,535 A | 1/1991 | Hadermann et al. |
| 5,110,565 A | 5/1992 | Weimer et al. |
| 6,063,855 A | 5/2000 | Pecsok et al. |

*Primary Examiner*—Edward M. Johnson
(74) *Attorney, Agent, or Firm*—Elmer A. Klavetter

(57) ABSTRACT

A method for making a blended powder mixture, whereby two or more powders are mixed in a container with a liquid selected from nitrogen or short-chain alcohols, where at least one of the powders has an angle of repose greater than approximately 50 degrees. The method is useful in preparing blended powders of Li halides and MgO for use in the preparation of thermal battery separators.

12 Claims, 1 Drawing Sheet

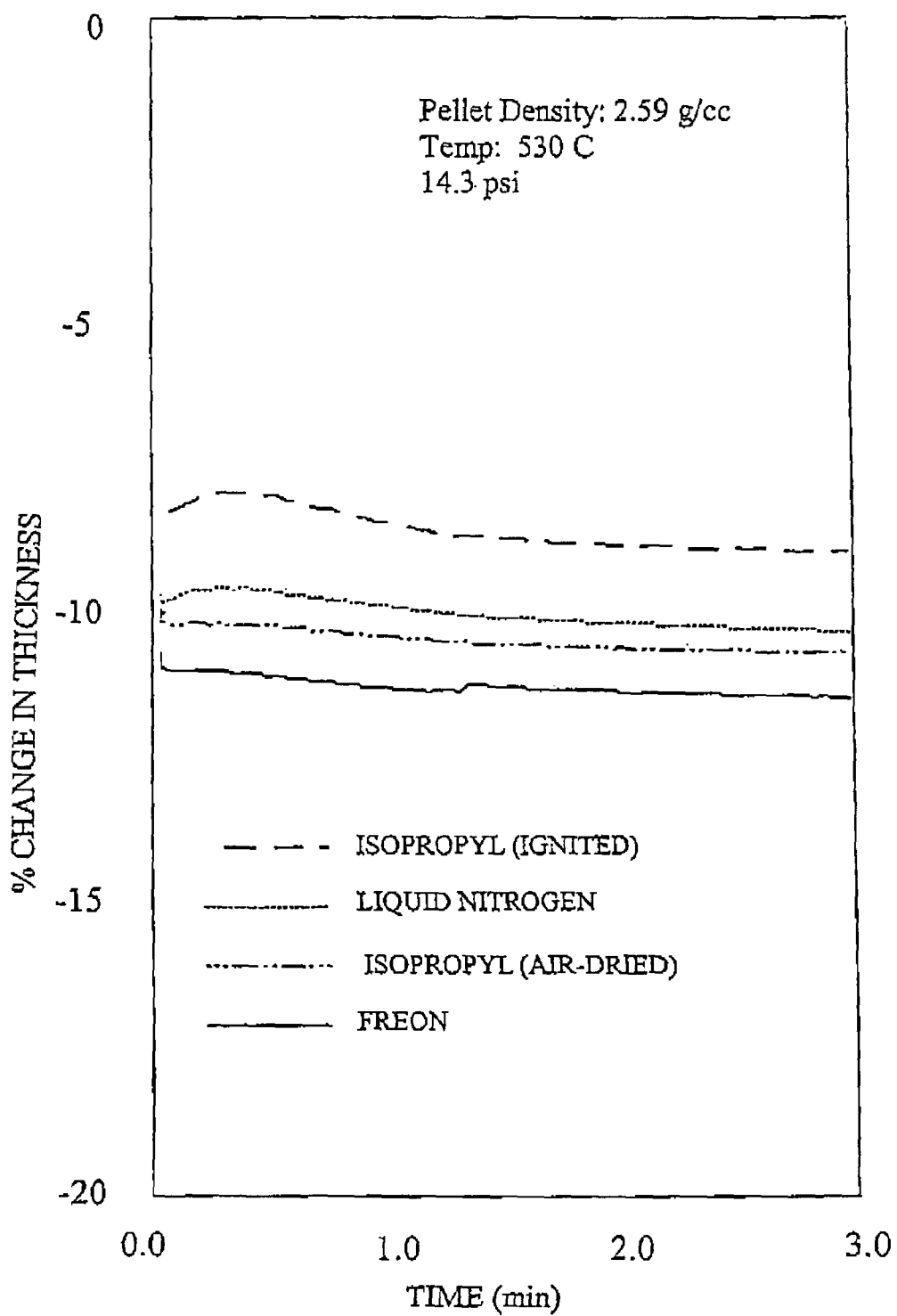

METHOD TO BLEND SEPARATOR POWDERS

This invention was made with Government support under Contract No. DE-AC04-94AL85000 awarded by the United States Department of Energy. The Government has certain rights in the invention.

BACKGROUND OF THE INVENTION

The present application relates to blending of powders and, more particularly, relates to the blending of moisture-sensitive powders using liquid nitrogen or liquid alcohols for use in making thermal battery separators.

Battery separators are physical barriers interposed between the anode and the cathode in a thermal battery that prevent physical contact therebetween. The separator provides ionic conductivity during discharge and is generally in the form of a pressed powder pellet commonly comprising a binder and a eutectic mixture (electrolyte) of lithium chloride and potassium chloride or of lithium fluoride, lithium chloride and lithium bromide, although other mixtures are known. The electrolyte is generally incorporated into an inert binder such as powdered magnesium oxide, zirconia, or aluminum nitride, which immobilize it by capillary action when the electrolyte is molten. The separators must be stable in the cell environment, resisting degradation by the cell media, must permit conduction across the separator of current transferring ions or charges and must be capable of operation under the conditions of use.

Formation of the separator from the powdered or particulate binder and electrolyte requires blending or mixing of the materials. It is difficult to obtain homogeneous mixtures of powders or finely divided solids by conventional dry mixing techniques, especially where there are significant differences in particle size, particle shape and specific gravity. Therefore, the blending for separator production has typically been accomplished using chlorinated or fluorinated hydrocarbon liquids such as the group of compounds under the name Freon™, marketed by E. I. DuPont. However, Freon™ can no longer be used because of environmental constraints and prohibitions of the use of chlorinated and fluorinated hydrocarbons.

Often, reactive liquids are used in the blending of solids where the blending occurs before substantial reaction of the liquid occurs, where the reactive liquid later reacts to form a solid matrix. However, if reaction of the blending liquid with the powders is not desired, liquids are required that are nonreactive, that have properties that facilitate the blending of the powders and that sometimes can also be removed from the blended powders. In blending of some solid particles, such as propellants or explosives, gaseous nitrogen has been adsorbed onto particles surfaces which thereby maintain the particles in a non-agglomerating, free-flowing state to allow subsequent mixing to be accomplished by simple tumbling. In other cases, liquid nitrogen is used to make the solids more brittle so that the solids can be ground and then mixed.

Useful would be a method for mixing of moisture-sensitive powders using inexpensive and non-reactive liquids.

DESCRIPTION OF DRAWINGS

The FIGURE shows the results of deformation tests with separator pellets made with LiCl—KCl eutectic electrolyte.

DETAILED DESCRIPTION OF THE INVENTION

The present invention is a method for blending powders (solid particle or particulate mixtures), particularly powders that are moisture sensitive, using liquid nitrogen or liquid alcohols. In the method of the present invention, two or more powders are mixed in a container with a liquid selected from nitrogen or short-chain alcohols, where at least one of the powders has an angle of repose greater than approximately 50 degrees. When using liquid nitrogen, the powders and the liquid can be mixed in a precooled metal container to avoid possible thermal-shock problems associated with glass containers. The container is precooled before use, such as with liquid nitrogen, to prevent rapid boiling that can cause sudden gas generation and overflow of powders from the container. An advantage to the method of the present invention is that relatively inexpensive industrial Waring-type blenders can be used rather than using expensive dry blending equipment, such a V-blenders or multiaxis blenders.

In one embodiment, the powders used are materials that are used in developing separators for thermal batteries. These materials consist of various powdered alkali-halide salts and MgO powder. Many of the salts contain Li halides that are very hygroscopic. Consequently, the blending of these materials needs to be carried out in a dry-room environment where the dew point is less than approximately −30° C. Under these blending conditions, it is possible to condense some moisture into the liquid-nitrogen blend when mixing. However, any moisture that is introduced is readily removed in a subsequent vacuum drying step.

The use of a liquid medium can be critical for uniform blending of some powdered materials. An earlier procedure that used liquid halogenated hydrocarbons worked very well for the various thermal-battery separator mixes. However, these halogenated hydrocarbons can no longer be used because of environmental constraints and prohibitions of the use of chlorinated and fluorinated hydrocarbons. Dry blending of powders that flow freely (that is, those with a small angle of repose) can be relatively easily accomplished by a number of dry-blending techniques. However, some powders, such a finely divided MgO, have a very large angle of repose (54 to 56 degrees). The electrolyte also can have a similar high angle of repose. The LiCl—KCl eutectic powder, for example, has an even higher angle of repose of 62 degrees and is difficult to uniformly blend with other powders. In comparison, it is noted that the angle of repose for the LiCl—KCl separator with 35% MgO was 62 degrees by previous Freon blending. The same material processed by liquid-nitrogen blending was 54 degrees, which is substantially lower. This improves the flowability of the material for pelletizing operations. This is one situation where a liquid medium offers definite advantages. Liquid nitrogen has similar desirable properties of some halogenated hydrocarbons but without the negative environmental attributes. Liquid nitrogen is inexpensive and readily available and is compatible with the components in the separator mixes. It is readily removed at room temperature by evaporation and is not toxic to personnel. With proper protective equipment, the possibilities of frostbite (cryogenic "burns") are minimal. There are no problems of disposal or waste.

Other liquids were considered that could be also be used. Standard aliphatic and aromatic organics were considered for use but are extremely flammable and have high vapor pressures. Their use would require elaborate hood precautions to avoid the exposure limits for personnel that would be using them. In addition, they would require some recovery system and could not be simply vented to the atmosphere, as this would violate federal and state regulations for such materials. These materials are also not inexpensive.

One other category of organic material that were considered to be suitable, however, were alcohols, including methanol, ethanol, and isopropanol. Typical physical properties of these three materials are listed as follows:

|  | Boiling Point, ° C. | Explosive Limit, % vol in air | Vapor Pressure, mm Hg | AGIH TLV TWA, ppm |
|---|---|---|---|---|
| Methanol | 65 | 6-36 | 97.7 @ 20° C. | 200 |
| Ethanol | 78 | 3.3-19 | 40 @ 19° C. | 1,000 |
| Isopropanol | 83 | 2.5-12 | 33 @ 20° C. | 400 |

The single-carbon alcohol, methanol, is toxic if ingested. It also has a relatively high vapor pressure. Isopropyl alcohol (isopropanol) is common rubbing alcohol and is relatively cheap with a relatively high permissible exposure limit and a narrow explosive limit. This makes it the best overall choice from a health and safety perspective.

Several tests were conducted with isopropanol. Anhydrous (less than 0.005% water) isopropyl alcohol as well as reagent grade material with approximately 0.2% water work equally well. In one case, a condenser was fitted to a vacuum oven to remove and recover the alcohol from the separator slurry. In another second case, the alcohol was simply burned off in the fusion furnace in the dry room prior to the actual fusion operation. The fusion step involves heating the separator above the melting point of the electrolyte to allow penetration of the pores of the MgO by the molten salt. The electrolyte is held in place by capillary action when it becomes molten in the separator after activation of the thermal battery. The resulting separator mixes made by this new blending process with liquid media were characterized by a number of techniques. The materials were pelletized and subjected to electrolyte-leakage and deformation tests and the results compared to materials made by Freon blending and dry blending.

The FIGURE shows the results of deformation tests with separator pellets made with LiCl—KCl eutectic electrolyte. The results show the change in thickness of the separator pellet when Freon was used to produce the pellet and compares those results with the data obtained for the separator pellets made using liquid nitrogen and isopropyl alcohol. In one case, the isopropyl alcohol was removed under vacuum under mild conditions (approximately 100° C.) and in another the alcohol was burnt off in a furnace prior to the fusion step of the preparation of the separator pellet. Using the separator pellets producing using the method of the present invention to blend the powders, the deformation characteristics were all similar to those observed for the pellet produced using Freon, demonstrating that liquid nitrogen and isopropyl alcohol can be successfully used as a replacement for the Freon.

The separators were also used in single-cell tests to compare the electrochemical performance to similar cells using the standard separators. Typical test results measuring the voltage and polarization voltage as a function of time showed that the voltage performance characteristics of the materials made by the new blending procedures are virtually identical to those made by dry-blending processes. These single cell tests were made using separator pellets made using Freon as the blending liquid, as well as using liquid nitrogen or isopropyl alcohol. The tests were performed at 500° C. with the various separator pellets with a background load of 125 mA/cm$^2$ which was pulsed to 250 mA/cm$^2$ or 885 mA/cm$^2$ for 5 sec every minute. The overall performance of the separator pellets made using the method of the present invention was similar to the performance of the separator pellets made using Freon as the blending liquid, where the performance was determined by measuring the voltage change and polarization change with time. The results demonstrate that using liquid nitrogen and isopropyl alcohol as the blending liquid in making the separator pellets is effective and provides similar quality of material as the separator pellets made with Freon. Equivalent results were obtained for all of the standard electrolytes now being used for typical thermal batteries (that is, batteries utilizing LiCl—KCl eutectic, LiCl—LiBr—LiF electrolyte (with an angle of repose of 61.9 degrees), and LiBr—KBr—LiF eutectic materials (with an angle of repose of 55.3 degrees). Among other materials, those materials based on LiNO$_3$—KNO$_3$ eutectic that melts at 124.5° C. and a eutectic electrolyte based on CsBr—LiBr—KBr can also be used in the method of the present invention.

While the examples discussed pertain to separator materials, this same approach is equally applicable to other powder mixes that normally are difficult to blend into a uniform composition. Liquid nitrogen can be used in place of isopropyl alcohol if any of the constituents are reactive toward the isopropyl alcohol. For materials that are not hygroscopic, it will not be necessary to process them in a dry-room environment.

EXAMPLE 1

Blending with Isopropanol 600 mL of isopropanol was added to a 1-quart glass Waring-type blender. Then 375 g of a low-melting electrolyte (LiBr—KBr—LiF eutectic, with an angle of repose of 55.3 degrees) was added and the slurry blended for 30 s. Next, 125 g of MgO was added and the resultant slurry was blended for an additional 60 s. The slurry was then filtered through a filter on a funnel to recover most of the isopropanol. The filter cake was then placed into a quartz dish in a calcination oven at room temperature in a dry room. The alcohol was ignited and after combustion was complete, a well-blended mixture remained. The mixture was heated in an oven at 400° C. for 16 hours to produce a fused material. After granulation and passage through a 60-mesh sieve, a relatively free-flowing separator powder resulted that was then ready for pressing into pellets.

EXAMPLE 2

Liquid-Nitrogen Blending of Low-Melting Electrolyte

The liquid-nitrogen blending was carried out in a 1-gallon sized stainless steel Waring-type blender in a dry room maintained at a dew point of −25° C. or lower. To avoid sudden or violent boiling of the liquid nitrogen when it is added to the container, the blender, quartz fusion container, electrolyte (such as LiCl—KCl eutectic with an angle of repose of 62 degrees), and MgO were precooled in a cool chamber set to between −55° C. to −65° C. Enough powder was weighed to make a 500-g batch of separator. The metal blender was placed on the motor stand, making sure that the blades turn freely. The blender was turned off and added the precooled electrolyte and MgO powders to the precooled metal blending container. The blending container was removed and tilted slightly while slowly pouring liquid nitrogen carefully down the sides until the powders are completely covered. Then the container was slowly brought to vertical. The container was placed on the blender. With the container at least half full with liquid nitrogen, the blender was turned on with the speed set to about 3,500 rpm (±10%). Liquid nitrogen was added as necessary to maintain a "milkshake-like" slurry and sustain good mixing. Blending occurred for approximately 2 minutes (±10%). After shutting off the blender, liquid nitrogen was added to the quartz fusing tray to cool it. The separator slurry was added to the precooled quartz fusing tray. Additional liquid nitrogen was added to the blending container to remove residual powder. Traces of powder was brushed into the fusion container. The liquid nitrogen was evaporated for about an hour. The powder mix was heated in a convection oven at 100° C. (±10%) for 1-2 hours to evaporate residual liquid nitrogen and fused at 400° C. (±25° C.) for 12-16 hours. The material was granulated and passed through a 60-mesh sieve to prepare the final separator powder.

The procedure is the same for other electrolytes, except that the relative amounts of materials can differ and the fusion temperatures can vary. For the all-Li LiCl—LiBr—LiF eutectic that melts at 436° C., a fusion temperature of 500° C. is used.

The invention being thus described, it will be apparent to those skilled in the art that the same may be varied in many ways. Such variations are not to be regarded as a departure from the spirit and scope of the invention, and all such modifications are intended to be included within the scope of the following claims.

We claim:

1. A method for making a blended powder mixture, comprising:

adding in a container a liquid selected from the group consisting of liquid nitrogen, methanol, ethanol and isopropanol, to a first powder and a second powder, said first powder having an angle of repose greater than approximately 50°, to form a mixture;

mixing said mixture to form a homogenous mixture; and removing said liquid to make a blended powder mixture.

2. The method of claim 1 wherein said second powder has an angle of repose greater than approximately 50°.

3. The method of claim 1 wherein said first powder is an electrolyte.

4. The method of claim 3 wherein said electrolyte is an alkali-halide salt.

5. The method of claim 1 wherein said first powder is selected from a LiCl—KCl eutectic powder, a LiCl—LiBr—LiF electrolyte powder, a LiBr—KBr—LiF eutectic powder, a $LiNO_3$—$KNO_3$ powder, and a CsBr—LiBr—KBr powder.

6. The method of claim 4 wherein the second powder is MgO.

7. The method of claim 1 wherein removing said liquid is performed by a method selected from evaporation and combustion.

8. The method of claim 1 wherein the liquid is liquid nitrogen and the container is precooled to a temperature less than approximately −55° C.

9. The method of claim 8 wherein the first powder and second powder are precooled to a temperature less than approximately −55° C.

10. The method of claim 1 wherein said blended powder mixture is heated at an elevated temperature to produce a fused material.

11. The method of claim 10 wherein said fused material is granulated and sieved to prepare a separator powder.

12. The method of claim 11 wherein said separator powder is pressed to form a separator pellet.

* * * * *